__United States Patent__ [19]

Head et al.

[11] Patent Number: 4,543,649

[45] Date of Patent: Sep. 24, 1985

[54] SYSTEM FOR ULTRASONICALLY DETECTING THE RELATIVE POSITION OF A MOVEABLE DEVICE

[75] Inventors: Kenneth O. Head; Arthur E. Bollinger, both of Kirkwood, Mo.

[73] Assignee: Teknar, Inc., St. Louis, Mo.

[21] Appl. No.: 542,696

[22] Filed: Oct. 17, 1983

[51] Int. Cl.$^4$ .......................... G01S 15/88; G01S 7/52
[52] U.S. Cl. ....................................... 367/96; 367/99; 367/902
[58] Field of Search ...................... G01S/15/88, 7/52; 367/13, 95, 96, 99, 108, 902, 908; 73/703

[56] References Cited

U.S. PATENT DOCUMENTS

| 2,743,429 | 4/1956 | Erdman et al. | 367/95 |
|---|---|---|---|
| 2,985,018 | 5/1961 | Williams | 73/703 |
| 3,237,150 | 2/1966 | Beck et al. | 367/902 X |
| 3,364,361 | 8/1965 | Burger . | |
| 3,453,937 | 7/1969 | Haberman . | |
| 3,572,208 | 12/1968 | Mott . | |
| 3,898,555 | 8/1975 | Tellerman . | |
| 4,008,455 | 2/1977 | Pedersen . | |
| 4,121,504 | 10/1978 | Nowak . | |
| 4,140,044 | 2/1979 | Biller et al. . | |
| 4,145,914 | 3/1979 | Newman | 367/108 X |
| 4,210,969 | 7/1980 | Massa | 367/108 |
| 4,229,798 | 10/1980 | Rosie et al. | 367/902 X |
| 4,470,299 | 9/1984 | Soltz | 367/908 X |

FOREIGN PATENT DOCUMENTS

| 0152476 | 11/1980 | Japan | 367/902 |
|---|---|---|---|
| 1525720 | 9/1978 | United Kingdom | 367/99 |

Primary Examiner—Richard A. Farley
Attorney, Agent, or Firm—Kalish & Gilster

[57] ABSTRACT

An ultrasonic system is responsive to the relative position of a movable device within a fluid-filled structure. A transducer transmits ultrasonic signals from a location fixed within the structure to the device for reflection thereby and for picking up the reflected signals. A reference target within the fluid, attached either to the structure or the device, also reflects the transmitted ultrasonic signals from also being picked up by the transducer, such reference target being a predetermined fixed distance relative to either the device or the structure, whereby the different picked up signals reflected from the device and reference target will have a timed relationship corresponding to such fixed distance, measurement circuitry means is responsive to the picked up signals reflected from the device and to such timed relationship for providing an output signal which is a function of change in the position of the device within the structure, being includes circuitry responsive to the timed relationship for causing the output signal to be compensated for changes in the velocity of ultrasonic signals in the fluid resulting from changes in parameters thereof subject to causing errors in the output signal. The structure is, for example, a fluid cylinder and the movable device is a piston within the cylinder. Alternatively, sensing of the parameter is used for output signal compensation.

8 Claims, 14 Drawing Figures

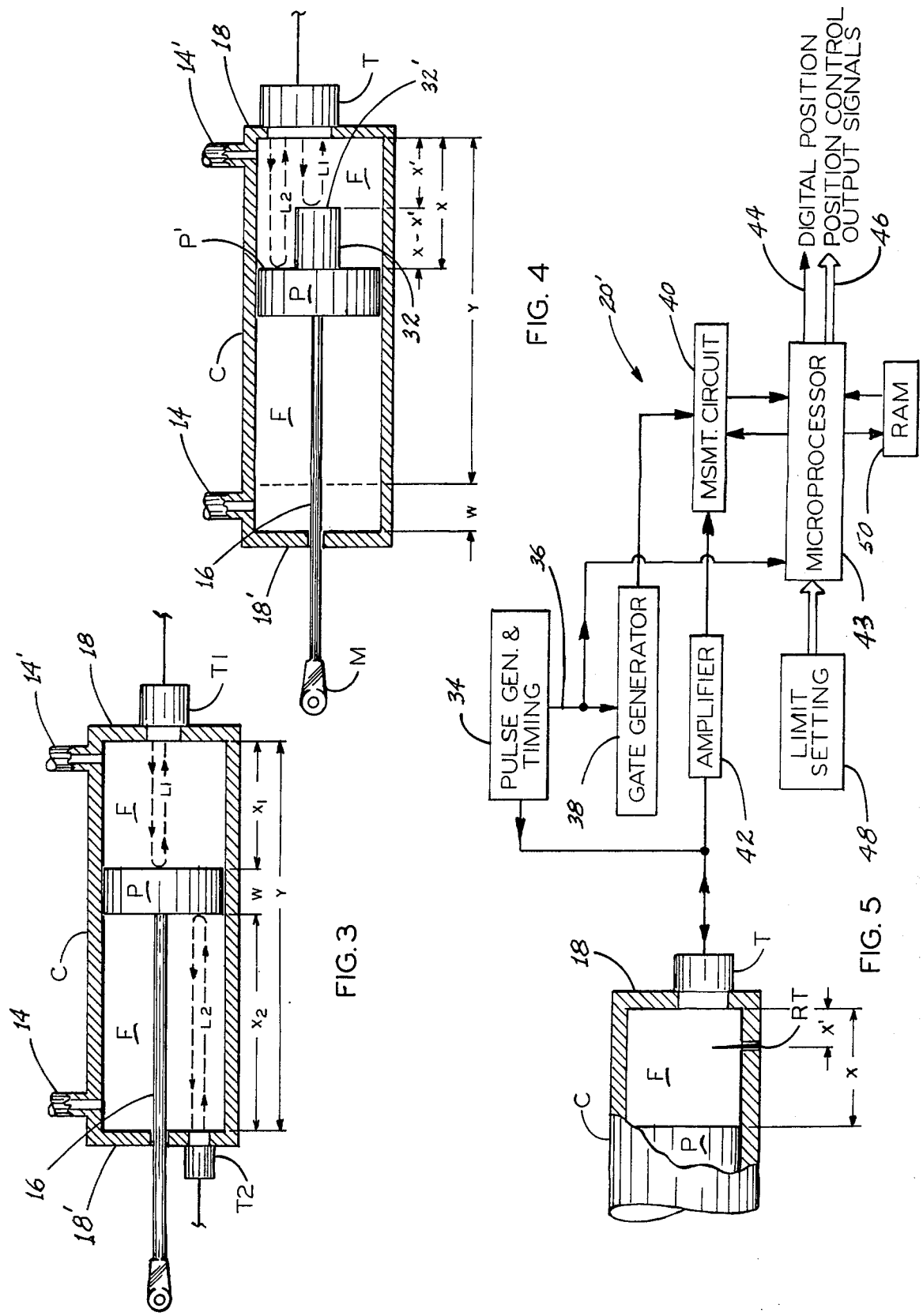

SYSTEM FOR ULTRASONICALLY DETECTING THE RELATIVE POSITION OF A MOVEABLE DEVICE

BACKGROUND AND SUMMARY OF THE INVENTION

This invention relates to ultrasonic position sensing and, more particularly, to an ultrasonic system for detecting the relative position of a moveable device, such as the piston of a fluid cylinder, relative to structure containing such device.

It has been proposed previously, as in Tellerman U.S. Pat. No. 3,898,555 and Biller et al U.S. Pat. No. 4,140,044, to employ a sonic delay line for continually monitoring the displacement of a hydraulic actuator piston. The delay line is configured, in such prior apparatus, to extend along the length of travel along the piston. An annular magnet is moved along the line by the piston, thereby providing a point of reaction for causing wave propogation along the delay line. The relative complexity of such an arrangement makes it relatively impractical for most applications.

There exist a wide variety of kinds of apparatus in which a device is moveable within a fluid-filled structure or vessel. Thus, there are many configurations of fluid actuators wherein a piston or equivalent device is moveable within the cylinder, such as hydraulic or pneumatic cylinders wherein fluid displacement causes, or is the result of, piston movement. The use of a transducer for ultrasonically monitoring the position of such piston or other device is hampered by errors resulting from the velocity of sound which, being dependent upon the medium in which it travels, is subject to variation resulting from changes in pressure or temperature of the fluid occupying the space between the transducer and the piston or other device. For example, in air, the velocity of sound may vary from about 330 me.-sec.$^{-1}$ to over twice that value over a temperature range of 0°–1000° C. Other fluids exhibit changes in the velocity of sound upon change in parameters characteristic of the fluid. Thus, in a hydraulic cylinder subject to variations in hydraulic pressure of several thousand p.s.i., the simple placement of a transducer at one end of the cylinder will not enable accurate determination of the position of the piston within the cylinder because of wide temperature and pressure excursions.

Limit switches have been used to detect the position of a piston within a hydraulic cylinder, such as upon reaching one end of the cylinder. Other mechanically-actuated devices have similarly been used, such as for controlling a pneumatic valve in response to movement of a piston within a pneumatic cylinder to a predetermined location. Such switches and other mechanical devices are prone to failure, are more expensive or cumbersome to use than desired, and are impractical for continually monitoring the position of, for example, the piston within a fluid-filled cylinder. Accordingly, there has been resort to such cumbersome expedients as the use of shaft position encoders and the like where it is desired to determine the position of a piston at any given moment, as in Novak U.S. Pat. No. 4,121,504 teaching the use of a rotary transducer associated with a shaft turned by movement of a piston within a hydraulic cylinder.

There are many applications for a system which can accurately determine, on a continuous basis, the relative position of a moveable device within a fluid-filled structure.

It is an object of the present invention to provide a system for accurately ultrasonically detecting the relative position of a moveable device within a fluidfilled structure containing the device.

It is another object of the invention to provide such a system which is particularly useful for accurately and continually monitoring the relative position of a piston within a cylinder where the cylinder contains a fluid or other medium which, by reason of changes in parameters characteristic of the fluid or, for other reasons, would produce error in position ultrasonic detection resulting from changes in the velocity of sound in the fluid.

It is a further object of the invention to provide such an ultrasonic position detecting system which can readily be employed with a wide variety of fluid-filled cylinders, such as hydraulic actuators, pneumatic cylinders, and myriad devices wherein a piston or other moveable device is moveable within structure containing a fluid through which ultrasonic energy must travel for position detection purposes.

Additionally, it is an object of the present invention to provide such an ultrasonic detection system which electronically can develop position or control signals which are a function of the instantaneous position of a moveable device within a fluid-filled structure.

Among other objects of the invention may be noted the provision of an ultrasonic system for accurately detecting pressure or temperature; which can be used for monitoring both position and parameters such as temperature and pressure; and which is useful for controlling the position of a moveable device, by continually, accurately monitoring its position, as a complex function of time.

Briefly, an ultrasonic system of the invention is useful for detecting the position of a movable device, such as a piston, within a fluid-filled vessel, such as a hydraulic or other fluid cylinder, containing the device, relative to structure of the vessel. An ultrasonic transducer is positioned, as at one end of the cylinder, for transmitting ultrasonic signals from such location to the device, where the signals are reflected, and for picking up the ultrasonic signals after they are reflected by the device. Circuitry is interconnected with the transducer and responsive to the time interval between the transmitted and picked-up signals for generating an electrical output signal which is a function of the position of the device within the vessel. Thus, in the case of a fluid cylinder, wherein a piston may be driven by fluid pressure over a range of possible positions within the cylinder, the function of the position of the piston along its course of travel at any given time is continually monitored. Further, the system includes correcting means for causing the output signal to be corrected as a function of at least ond parameter characteristic of the fluid which is subject to causing error of the output signal. Such parameter may be the fluid pressure or temperature, changes of which are otherwise prone to cause error in the position output signal because of variations in the velocity of sound transmitted through the fluid.

An ultrasonic system of the invention may also include circuity for comparing the position of the device with the desired limits for other data and for providing control signals as a function of such comparison, as for control purposes or to signal the coincidence of the device with a desired position. An ultrasonic system of the invention may also be utilized for pressure or temperature detection as in response to a pressure-reduced change in position of a moveable device such as a diaphragm, aneroid, bellows or piston.

Other objects and features will be in part apparent and in part pointed out hereinbelow.

BRIEF DESCRIPTION OF THE DRAWINGS

FIG. 3 is a similar simplified cross-sectional illustration of a fluid cylinder with a different ultrasonic sensing arrangement of the invention shown therein.

FIG. 4 is yet another simplified cross sectional illustration of a fluid cylinder with a further ultrasonic sensing arrangement of the invention.

FIG. 5 is a schematic circuit diagram of control circuitry of the invention, as connected with an ultrasonic transducer at one end of a fluid cylinder.

Corresponding reference characters indicate corresponding parts throughout the several views of the drawings.

DESCRIPTION OF THE PREFERRED EMBODIMENTS

Figure 1:
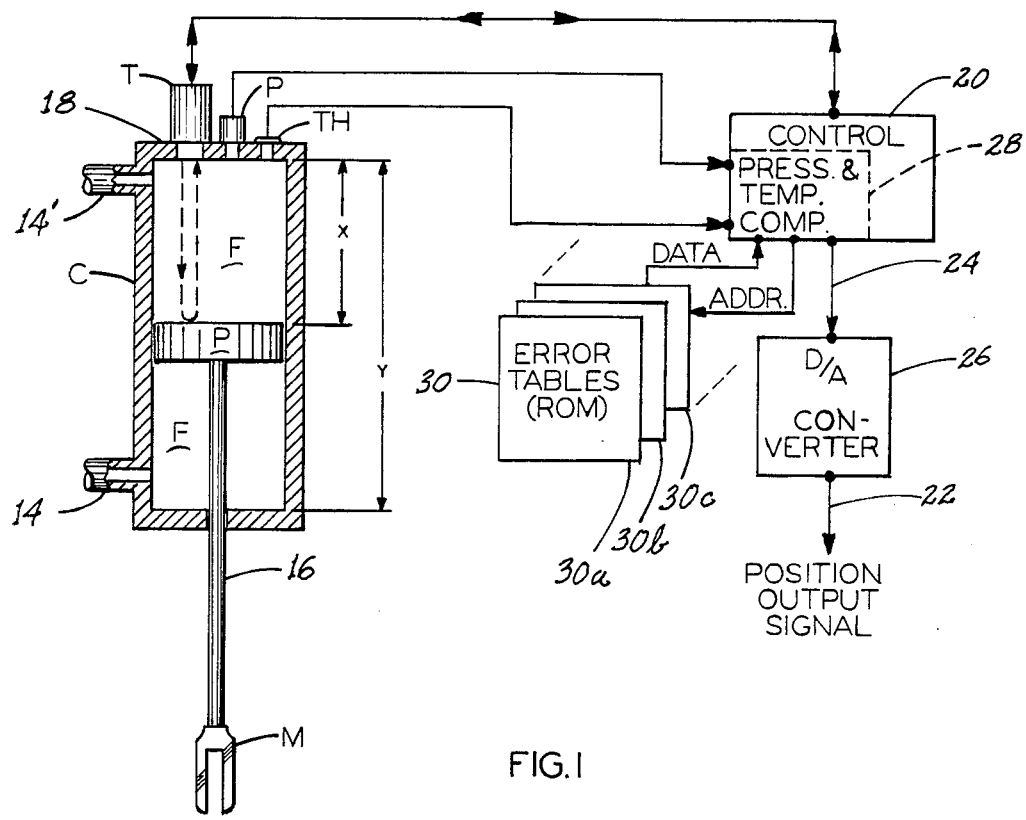
FIG. 1 is a partly pictorial, partly schematic illustration of a system including a hydraulic or other fluid cylinder and circuitry for ultrasonically determining the position of a fluid-driven piston within the cylinder, in accordance with the present invention.

Referring now to the drawings by reference characters, and particularly to FIG. 1, an ultrasonic position detecting system of the invention in accordance with a first embodiment of the invention is illustrated. A fluid cylinder C having a moveable piston P therein is illustrative of a number of pneumatic or hydraulic fluid cylinders such as utilized for a wide variety of applications and purposes in many fields, with fluid being provided or rewaved from the cylinder through fluid conduits 14, 14' for corresponding movement of piston P. The piston is interconnected as by an actuating rod 16 to a work-producing or other moveable structure M for causing work to be performed by member M. Alternatively, member M may be operated by other apparatus or structure for driven movement of piston P with consequent change of position within cylinder C.

In accordance with the invention, a conventional ultrasonic transducer T is positioned within the cylinder structure 18 at one end of cylinder C for causing ultrasonic signals to be transmitted toward piston P and reflected by it for being picked up by the transducer. In the embodiment shown, the ultrasonic signals are transmitted by transducer T, travel through the fluid F which fills the interior of cylinder C, such as gas or hydraulic oil, the signals travelling in a direction normal to the flat face of piston P, and being reflected, also normal to such surface, and travel back to transducer T for being picked up. As shown, the distance between such face of piston P and the end of the cylinder C, is designated x, and the overall length within cylinder C is designated y.

Transducer T is interconnected with circuit means 20 for generating an electrical output signal by means of an output 22 which is a function of the position of piston P within cylinder C. Said output signal is generated by circuit means 20, which may be referred to as control circuitry of the invention. The output of control circuit 20, as designated at 24 may be in digital form as is conventionally available from microprocessor-controlled circuitry which has heretofore been utilized for ultrasonic measurement purposes. Said output 24 may, as shown, be interconnected with a digital-to-analog ("D/A") converter 26 whereby the digital signals will be converted to an analog position output signal at output 22.

Also shown interconnected with control circuit 20 is a pressure transducer or sensor P which is fitted to cylinder C for measuring the pressure of the fluid F therein. The cylinder C is also fitted with a device such as a thermister TH for sensing the temperature of the fluid F. Thermister TH is similarly shown interconnected with control circuitry 20 which includes correction circuitry 26 for causing the position output signal to be corrected as a function of the pressure and temperature of the fluid F.

Since fluid F constitutes a transmissive medium through which the ultrasonic signals must travel from the transducer T, for reflection from piston P, and for thereafter being picked up by the transducer T after an interval of time which will depend upon the distance x to the face of piston P, it will be appreciated that the interval of time will vary according to the speed of sound within fluid F. As is known, such speed is dependent not only upon the pressure but also the temperature of this sound-transmissive medium.

Fluid F is, in FIG. 1, assumed to be hydraulic oil. However, the invention is useful for other types of apparatus wherein a device is moveable within structures of the apparatus, there being an intervening fluid or gas through which ultrasonic energy, i.e., signals of frequency greater than about 16 kHz are propagated by stress waves.

In the case of liquids, the velocity of sound, c (cm · sec$^{-1}$) is $$c = (P\beta_s)^{-\frac{1}{2}}$$

Where P is the density and is the adiabatic (isothermal) compressibility (cm$^2$ · dyn$^{-1}$). Further $$\beta_s = \frac{C}{L + P}$$

where C is a constant for a given liquid, L is also a constant for such liquid at a given temperature, and P is the pressure (dyn · cm$^{-2}$). Therefore, C is highly variable in response to changes in temperature and pressure.

In the case of gasses, the velocity of sound, assuming an ideal (perfect) gas is given by $$C^2 = \gamma \frac{RT}{M}$$

where R is the gas constant, T is the absolute temperature ($^0$k), M is the molecular weight, and is the ratio of the specific heats, $C_p:C_v$, $C_p$ being the specific heat at constant pressure, $C_v$ being the specific heat at constant volume. In a real gas, C is determined by (where f is a complex function of temperature, the critical temperature, and the critical pressure.)

$$C^2 = \gamma \cdot \frac{RT}{M} (1 + f)$$

Accordingly, pressure and temperature of fluid F are parameters, subject to change, which are characteristic of the fluid F and variations of which parameters are subject to causing error of the position output signal provided by output 22. Correcting circuitry 26 functions with thermister TH, to cause the output signal to be corrected as a function of such parameters.

If control circuit 20 is of the type, as heretofore commercially known, for providing an output signal upon its output 24 which varies according to the time interval between a transmitted and received ultrasonic signal, as transmitted and received by transducer T, correction can be implemented by providing error tables 30a, 30b, 30c, etc., in the form of integrated circuit memories of the ROM (Read Only Memory) type, in each of which is stored data at specific addresses corresponding to a correction factor to be applied by the temperature compensation portion 28 of control 20 in accordance with the actual pressure and temperature sensed by sensor P and thermistor TH respectively. For this purpose there may be an address associated with each address or each pressure within an expected range and with there being stored at such address a correction factor as data to be read by the control circuit 20 for correction of the position output signal accordingly.

If cylinder C is of the hydraulic type of cylinder wherein fluid F is a hydraulic oil and movement of piston P is produced by the development of relatively high, such as 3000 p.s.i. or more, pressure changes, as sensed by sensor P will be relatively rapid, whereas thermistor TH may not be responsive to rapid fluctuations in the temperature of fluid F. Thus, under some modes of usage, thermistor TH may be omitted with correction being made only by the use of pressure sensor P for causing correction circuitry to make a compensation in the output signal upon output 22 only in response to changes in pressure.

Correspondingly, where pressure changes are of inconsequential magnitude but the temperature of fluid F may be subject to wide variation, pressure sensor P may be eliminated and thermistor TH only used for causing correction by the correcting cicuitry 28. Thus, in a very low pressure cylinder C, such pressure changes may be neglectible.

Figure 2:
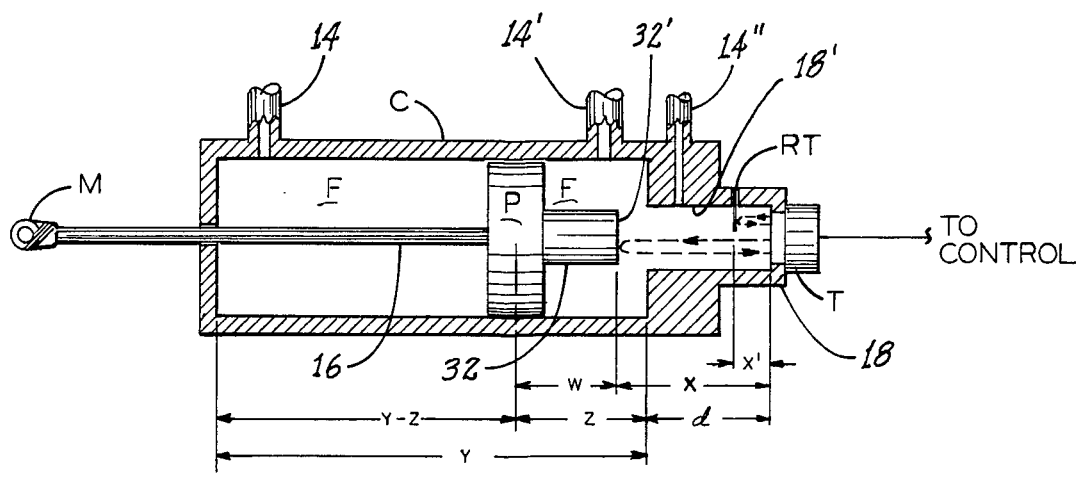
FIG. 2 is a simplified cross-sectional illustration of a fluid cylinder including an ultrasonic sensing arrangement of the invention therein.

Referring to FIG. 2, an arrangement of a hydraulic cylinder C is shown therein wherein piston P is of the type having a so-called spud 32 at one end of piston P opposed from the piston rod 18. Spud 32 provides a surface 32' directed toward an end structure 18 of cylinder C equipped with a transducer T in its outer end. Ultrasonic signals are transmitted from transducer T for reflection from surface 32' and for then being picked up by transducer T after a time interval which is measured by control circuitry, as described in FIG. 1, of conventional configuration for providing an appropriate output signal which is a function of such time interval and thereby representative of the ultrasonically measured position of piston P within cylinder C.

Spud 32 may be used for reducing the speed of travel of piston P as it approaches transducer T by entry of spud 32 into a bore 18' within structure 18, from which hydraulic cylinder may flow only through a reduced diameter conduit 14' and with the main hydraulic outlet through conduit 14' being blocked by piston P as it approaches its extreme position proximate transducer T.

Correcting means is provided for causing the output signal developed by the control circuitry to be corrected as a function of the velocity of ultrasonic signals within fluid F. The fluid is subject to variations in pressure and temperature. Variations of these characteristic parameters cause error of the output signal. For this purpose, a reference target RT is utilized. Said target RT may be in the form of a thin metal pin located a predetermined distance x' from transducer T within said cylinder structure 18. Thus, the transducer is responsive to the time interval between the transmitted signals and those picked up by reflection also from reference target RT, in addition to those signals reflected from the spud surface 32'. As explained hereinbelow, the control circuitry may then also include circuit means for comparing such time intervals of the signals reflected from the piston spud 32 and the reference target RT for correcting the output signal as a function of the compound time intervals, and thereby correcting the output signal of such control circuitry for any errors which would be caused by the variation in velocity of the ultrasonic energy produced by transducer T within fluid F.

In this way, a highly precise determination of the position of piston P may be ultrasonically measured. Thus, if the position of the spud face 32' from transducer T is x, and the spud face 32' is displaced from the center of piston by a distance w, the displacement of the transducer T from the cylinder end being d, and where the overall length of the interior of cylinder C is y, the distance z of piston P from the right hand end of cylinder C may be measured by the control circuitry by addition and subtraction, as necessary. Thus, for example, the distance z of piston P from the right hand end of cylinder may be determined by the circuitry readily by digital or analog addition or subtraction by control 20, by the relationship $z = y - w - x$. By use of reference target RT, correction of the apparent distance x to the piston may be corrected by multiplication by a correction factor determined by the ratio of $x'_{meas.}/x'$, when $x'_{meas.}$ is the apparent, or measured, distance to the reference target and $x'$ is the time distance to it, since the distance between the center of piston P and the reflecting face 32' is always a fixed value w.

Referring now to FIG. 3, an alternate correcting arrangement is disclosed, wherein cylinder C is provided with two transducers T1 and T2 at opposite ends 18, 18'. Control circuitry of the invention is interconnected with each of the transducers for measurement of the time intervals of the ultrasonic energy to travel from the respective transducer, reflection off piston P and then being picked up by the respective transducer. This produces respective lengths of travel for the ultrasonic energy of L1 and L2. Thus, such ultrasonic path lengths are twice the distance $x_1$ and $x_2$ from the ends of cylinder C to the corresponding faces of piston P, which latter has a thickness of width w. The overall distance y, from one of the cylinder to the other is given by $y = x_1 + w_2 + w$. Any variation in the speed of propagation of ultrasonic energy through the fluid medium F will be compensated for, since the ratio L1/L2 will always be indicative of the true position of piston P within cylinder C regardless of any changes in the speed of the ultrasonic energy within fluid F resulting from changes in pressure or temperature. In this way, the ratio L1/L2 provides the ration $x_1/x_2$. Also, since w is known, such ration L1/L2 can also be used to determine $x_1$ or $x_2$ or the rations $x_1/y$ or $x_2/y$.

Referring to FIG. 4, a hydraulic cylinder C is shown as having a piston P with spud or projection 32 at one end thereof, and facing toward the cylinder end 18 equipped with transducer T. Transducer T is interconnected, as in the previous embodiment, with conventional ultrasonic control circuitry for measuring the time interval between the ultrasonic signals transmitting by transducer T and those received after reflection. In this case, spud 32 is used as a surface for providing a reflective face 32' for reflection of ultrasonic signals in addition to those reflected from the main piston face P'. These two different reflective faces will produce corresponding ultrasonic path lengths within the fluid medium F of L1 and L2, corresponding to respective distances $x'$ and s, as shown. If said piston P has a thickness of w, there is an overall range of travel y for piston p within cylinder C. Accordingly, the ratio L1/L2 can be utilized to develop an accurate measurement of the position x and, since y is known, the control circuitry may be utilized to develop the ratio x/y which will be accurately compensated for any changes in parameters of fluid F which may effect the velocity of ultrasonic energy propagated through the fluid.

Referring to FIG. 5, a hydraulic cylinder C provided with a transducer T within its end structure 18 is illustrated interconnected with a further embodiment 20' of control circuitry of the invention. Cylinder C is also equipped with a reference target RT located precisely a fixed, predetermined distance from transducer T whereby a comparison of ultrasonic signals will be reflected not only from the face of piston P but also said reference target RT. The latter may be, as before, in the shape of a thin metal pin extending laterally into the cylinder at right angles to the path of ultrasonic energy transmitted by the transducer.

Conventional pulse generating circuitry is designated 34 for generating pulses to be transmitted by transducer T, and for serving also a timing function by providing timing pulses on an output 36. The timing pulses may be provided through a conventional gate generating circuit 38, for establishing a gate period for measurement of a timing interval by measurement circuit 40. An amplifier 42 amplifies the ultrasonic signals received by transducer T after reflection to measurement circuit 40. A microprocessor 42 of conventional integrated circuit type is provided for controlling measurement circuit 40 and for providing appropriate output signals upon outputs 44 and 46. Limit setting may be provided by circuit 48 which may consist of simple BCD-encoding thumbwheel switches for establishing control limits to be made available to microprocessor 42.

In operation, the microprocessor may cause measurement circuit 40 first to measure the time interval required for reflection from signals from reference target RT, storing these in random access memory RAM of microprocessor 42, and then causing measurement of the time interval required for signals to be reflected from piston P and picked up by the transducer. These two measurements, stored by the RAM 50 corresponding to distances of x and $x'$ from the transducer may then be used by processor 42 as a scaling factor for correction of the measured value x represented by the time interval required for return of reflection from piston P. If $x'_{meas.}$ is the apparent value of $x'$, then the corrected value of x is given by $$\text{given by } x_{corr.} = \left( \frac{x'}{x'_{meas.}} \right) x_{meas.}$$

Where $x_{meas.}$ is the apparent value of x. Such value represents the true value of x to a high degree of precision. The information thus derived may be derived to provide on output 44 a digital position such as the corrected value x or, if the piston has an available total travel y, the ratio x/y, and so forth. Control circuitry 20' may be also utilized to provide for control of other functions which are to be determined on the basis of the position x of piston P within the hydraulic cylinder C. For this purpose, output 46 may provide position control output signals for various types of control purposes whenever the position x corresponds to a limit setting determined in advance by the position of the limit setting circuit 48.

According to one preferred mode of operation, microprocesser 42 may be utilized to provide calibration of the output signal on outputs 44, 46 by measurement of the time intervals corresponding to the distances $x'$ and x on alternate cycles.

High resolution of the position x of piston P or other device within the structure defined by cylinder C, according to the present invention, it is potentially extremely high. Thus, if a closck frequency of 25 MHz for the timing and pulse generating circuitry 34 is utilized, the resolution may be expressed as $$\Delta T = \frac{1}{25 \times 10^6} = 40 \text{ nsec.}$$

If the velocity of ultrasonic energy within a fluid medium is, for example, 1500 me - sec$^{-1}$ the distance error may be expressed as $$\Delta L = 1500 \ (4 \times 10^{-8}) = 0.06 \text{ micron.}$$

However, since the distance L travelled by waves from the transducer and return to it is actually twice as far as the measurement between the transducer and the point of reflection from the moveable reflecting device, the true resolution is x=0.03 micron.

Figure 6:
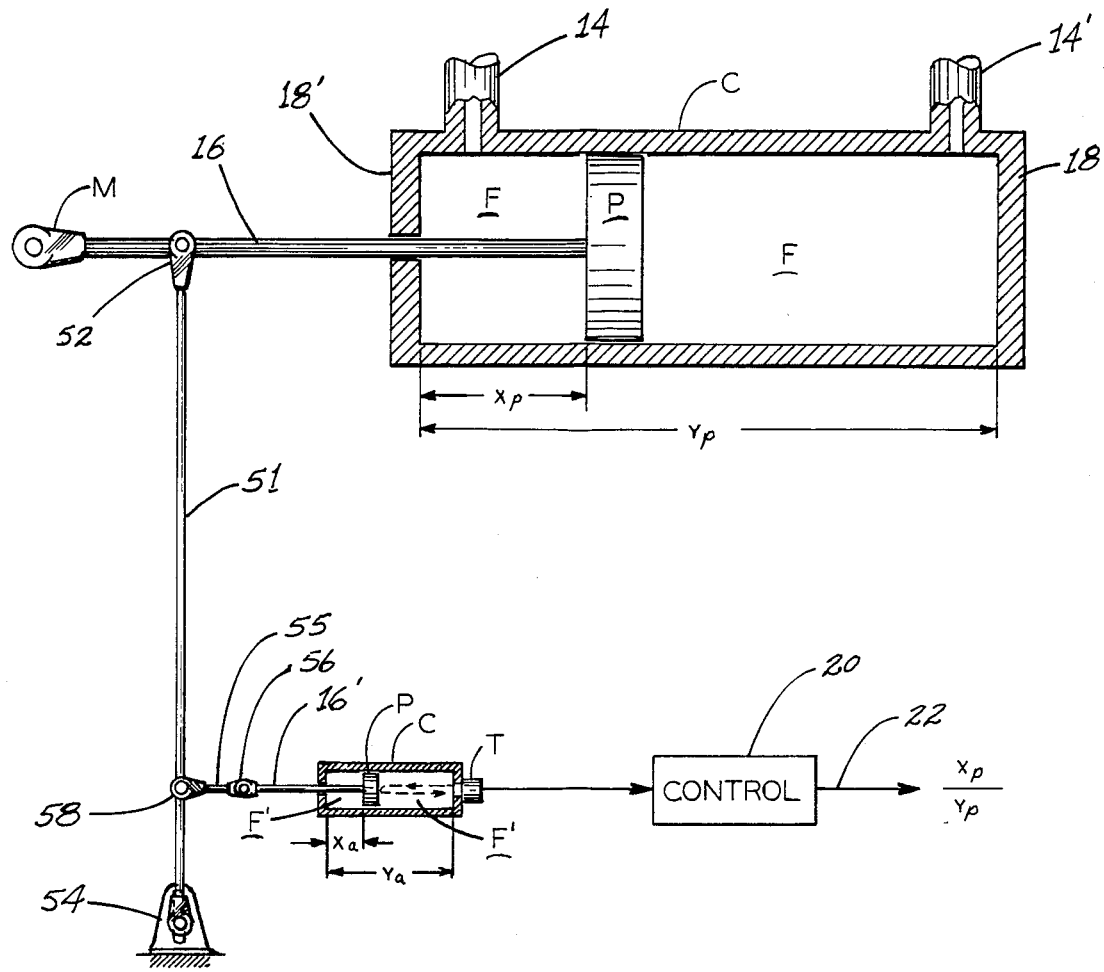
FIG. 6 is a schematic illustration, showing a principal fluid cylinder in simplified cross section, as well as an auxiliary cylinder having elements interconnected mechanically with those of the principal cylinder, there being an ultrasonic transducer and control circuitry associated with the auxiliary cylinder for determining the relative position of the piston within the principal, or main, fluid cylinder.

Referring to FIG. 6, cylinder C is shown as being of the type having a relatively large configuration with a piston P located therein for being driven to positions within the cylinder by fluid pressure as a result of fluid received or discharged through conduits 14, 14'. The distance between either end of cylinder C and piston P may be so large that it is impractical or otherwise difficult to utilize a transducer within the cylinder C or the substance within cylinder C may be bright elastomeric, viscous, particulate or granular, for example, as in the case of a chemical or mixture preventing effective propagation of ultrasonic energy, yet it being desirous to determine the position of the piston accurately, such as to measure the distance $x_p$ as a ratio of the overall dimension $y_p$ interior within cylinder C with corresponding movement of member M. For this purpose, a link 51 is provided, pivotally interengaging connection rod 16 at a point 52 proximate member M and a pivot 54 which may be slotted or otherwise configured for permitting vertical movement of the lower end of the link. A slave cylinder C' of relatively small dimensions and filled with a fluid F' such as mineral oil or a silicone has positioned within it a piston P' connected by a connecting rod 16', including an intermediate link 55 located between a pivot 56, and a pivot 58 upon link 51. By this arrangement, piston P' is slaved to piston P and will move within cylinder C. The linkage between connecting rod 16 may be more refined than that shown to cause the distance $x_a$ to be more closely proportioned to $x_p$ so that the precise relationship $(x_a/y_a) = (x_p/y_p)$ is obtained. But in thie arrangement shown, such ratios are approximately equal. Piston P' may fit within cylinder C' in such a way that fluid F' may be readily displaced from one side of the piston to the other, by appropriately dimensioning piston P'. Therefore, fluid F' ordinarily will not be exposed to changes in pressure or temperature in response to movement of piston P within cylinder C. Thereby, transducer T, located at one end of cylinder C' can accurately measure the relative position of piston P' by the use of a control 20 as hereinabove described, providing an output 22 such as representative of the ratio $x_p/y_p$.

Figure 7:
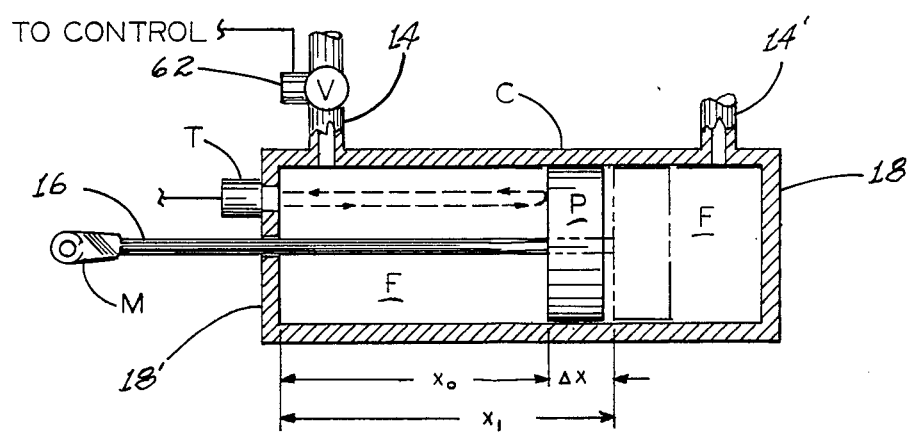
FIG. 7 is a simplified cross-sectional illustration of a fluid cylinder, as provided with an ultrasonic position sensing arrangement of the invention, depicting anticipatory position sensing relative to movement of the piston.

According to some usages of the invention, such as in hydraulic cylinders wherein piston travel may be relatively rapid, anticipatory measurement of the position of the piston may be necessitated. Referring to FIG. 7, transducer T is shown located at the left end 18' of the hydraulic cylinder C for causing ultrasonic energy to be directed toward piston P and reflected from its rear face. During movement of piston P toward end 18, assume it is desired to stop piston P at a position precisely a distance $x_1$ from the rear cylinder wall 18'. Hydraulic fluid is admitted through conduit 14 through a solenoid-controlled valve 62, as controlled by a controlcircuit 20 of the invention or as shown in FIG. 4. Accordingly, valve 62 is operated when the control has measured displacement of the piston to a position having a distance $x_0$ from the cylinder end wall 18', but with delay in operation of valve 62 by the circuitry permitting travel of piston P over a further distance x. It is determined by simple experimentation that piston positioning, using such anticipatory control, can be achieved with a high accuracy such as within a few microns, such as especially where high frequency ultrasonic energy is utilized, as within the range of 1–10 MHz.

Figure 8A:
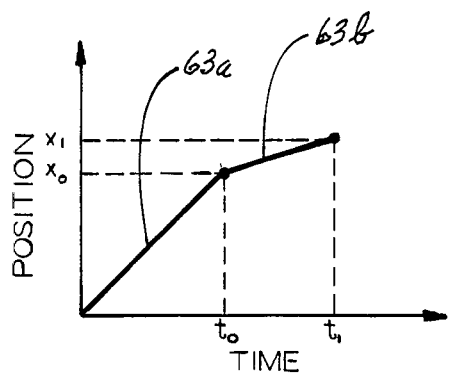
FIGS. 8A and 8B are plots in which the ordinate represents the position of a piston within a fluid cylinder moving as a function of time, which is represented along the abscissa, as controlled in accordance with the invention.

Alternatively, piston placement may accurately be obtained by reduction of the speed of travel of the piston prior to reaching an ultimately desired positioning. Referring to FIG. 8A, the position of the piston is plotted as a function of time. In a first region 63a of the curve, the piston may be moving at a relatively high speed, $v_1 = x_0/t_0$. At a time $t_0$ control circuitry of the invention, determining the position of the piston to be $x_0$, causes reduction in the rate of fluid flow for causing the velocity of the piston to be reduced to a value $v_2 = (x_1 - x_0)/(t_0 - t_1)$, such as less than about 250 cm. - min.$^{-1}$. In that way, the piston may proceed more slowly to its ultimate position $x_1$, which is then obtained with a very high degree of accuracy, as shown in region 63b.

Figure 8B:
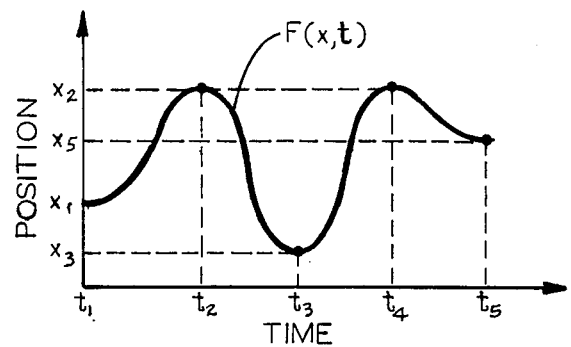

A system of the invention may be utilized for the control of a moving device within a fluid-filled medium enclosed by structure, such as a hydraulic cylinder, to provide for hitherto unobtainable accuracy and simplicity in controlling of the positioning of the device as a complex function of time. For example, referring to FIG. 8B, a complex function F (x, t) is shown as representative of the movement desired for the device. By continually, accurately monitoring the position of the device by ultrasonic apparatus of the invention, movement of the device may begin at a position $x_1$, relative to the transducer, and moving according to increasing and then cecreasing velocity to a position $x_2$ at a time $t_2$, reversing its direction as, for example, according to a sinusoidal function to a position $x_3$ at a time $t_3$, once more reversing and returning to a position $x_2$ at a time $t_4$ and finally asymptotically, accurately approaching an ultimate position $x_5$ at a time $t_5$. The device may, for example, be a piston within a high pressure hydraulic cylinder, such as used in automatic precision machining, process control and so forth.

Figure 9:
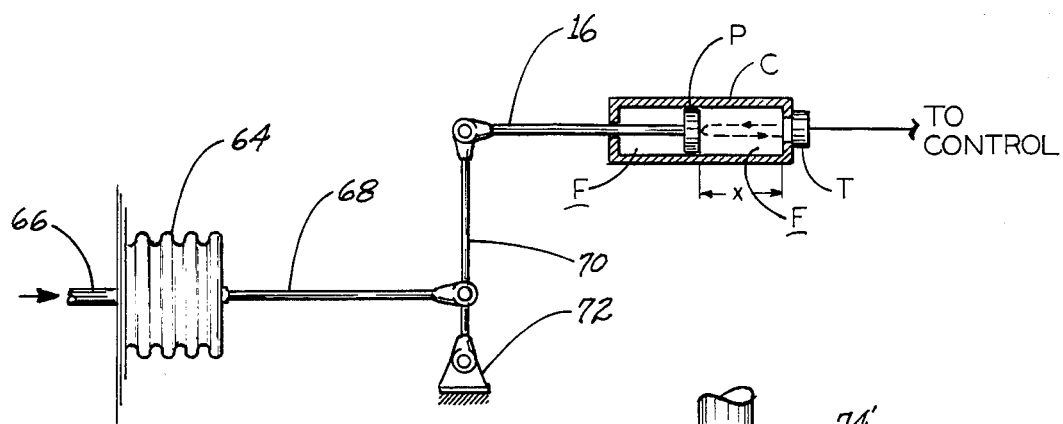
FIG. 9 is a pictorial representation of a mechanical system, including an aneroid interconnected with a piston located within a cylinder equipped with an ultrasonic position sensing arrangement of the invention, for measuring a gas or fluid pressure change.

With reference to FIG. 9, a system of the invention is useful also for providing pressure measurement. At 64 is designated an aneroid bellows for expansion or contraction in response to pressure connecting through a conduit 66. A link 68 extends from one end of the bellows, being pivotted from a further link 70 having one end pivotally connected to a suitable pivot 72 and the other end pivotally interconnected with piston rod 16. A transducer T is interconnected with control circuitry of the invention, as of the configuration previously described hereinabove, for measurement of the position of piston P relative to transducer T. Although not shown, error tables, thermistors, pressure sensors or reference targets as proposed herein may be utilized to compensate for changes in fluid F resulting from any variations therein which may be error-producing. Alternatively, piston P may be dimensioned for permitting the fluid to flow from one side to the other of the piston without change in pressure or temperature thereby to avoid changes in the velocity of ultrasonic sound through fluid F.

A change in pressure communicated through conduit 66 will cause corresponding expansion or contraction of bellows 64, as for example, resulting from a variation in barometric pressure, or other gas or fluid medium communicated through conduit 66. Such variations will cause corresponding change in the position of piston P, as multiplied by link 70. If x is the distance between transducer T and the corresponding face of piston P, $$\Delta P = K \Delta x$$

where P is the difference in pressure in the medium to which conduit 66 provides communication for the interior of bellows 64, $\Delta x$ is a change in the position of piston P sensed by control circuitry of the invention, and K is a scale factor.

Figure 10:
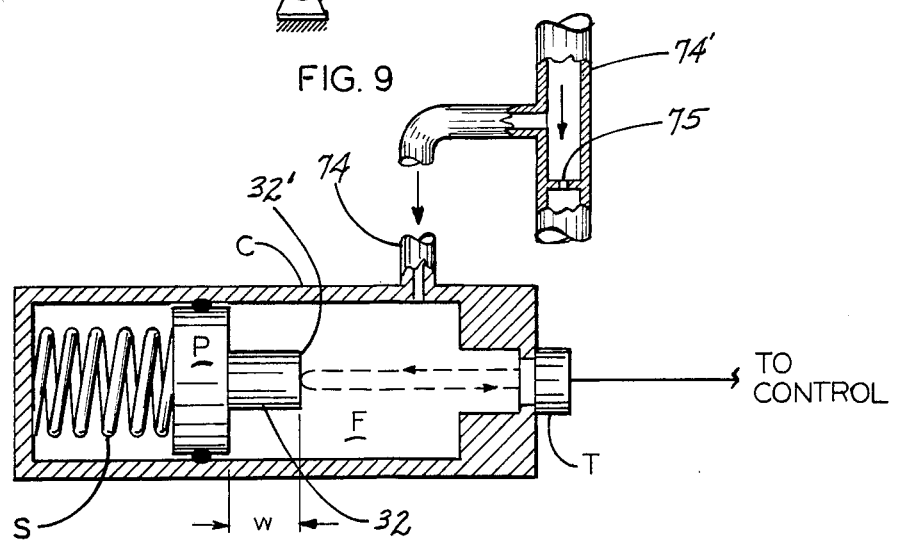
FIG. 10 is a simplified cross-sectional illustration of a pressure-responsive device including a cylinder and a movable piston or element therein, the cylinder being equipped with an ultrasonic transducer for determining the position of the element, and thereby pressure, by ultrasonic measurement in accordance with the invention.

FIG. 10 discloses another embodiment of pressure-responsive apparatus of the invention, the piston P having a spud 32 or other projection from its forward face oriented for reflecting ultrasonic energy received from a transducer T. Ultrasonic energy also is reflected from the front face of piston P. A spring S is positioned rearwardly of the piston P for being compressed in response to changes in pressure F resulting from communication through a conduit 74, whereby piston P will shift axially within cylinder C to a position which is a monotonic function of the pressure of the fluid medium F. Such position may be continually monitored by control circuitry of the invention as hereinabove described to provide an output signal which is a function of the instantaneous position of piston P and, thereby, which is a function of the pressure in the fluid medium. Error correction necessitated by changes in the parameters associated with said fluid F, such as changes in pressure or temperature, may be compensated by the control circuitry by taking into account the fixed dimension w constituting the displacement of the spud face 32' from the forward face of piston P. Such apparatus may be used as a flow rate sensor and, for this purpose, conduit 74 is shown interconnected with a still larger conduit 74' at a point upstream of an orifice 75, the pressure upstream of such orifice being proportional to the volumetric rate of flow through conduit 74.

Figure 11:
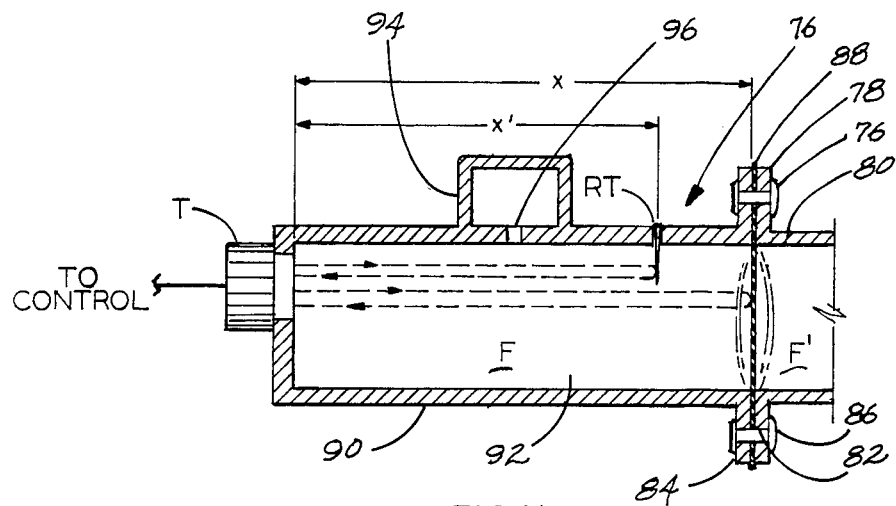
FIG. 11 is a multiplified cross section of a flange-mounted pressure sensor including a diaphragm ultrasonically monitored in accordance with the invention for measuring pressure.

A further pressure-responsive embodiment of apparatus of the invention is shown in FIG. 11. Such embodiment, represented in its entirety generally by reference numeral 76, is configured for being mounted to a flange, generally designated 78 such as may be present in liquid- or gas-handling or processing systems, as in chemical processing wherein conduits convey chemicals, intermediates, feedstocks or various industrial substances between different locations and wherein it is desired to monitor the pressure but where there must be isolation between the liquid or gas to be measured and the measurement apparatus, as in the case of corrosives and substances at high temperatures.

Flange 78 is provided at one end of a conduit 80 forming part of such a fluid handling or processing system. The flange is circular, having a plurality of apertures and permitting a corresponding flange 84 of apparatus 76 be secured to flange 78 by bolts or other fastening means 86 but with a flexible membrane or diaphragm 88 clamped between flanges 84 and 78. Such membrane may be of a suitable strong, flexible material such as may be impervious to the fluid F' within conduit 80 but sufficiently capable of flexing in response to changes in pressure. Apparatus 76 comprises a vessel 90 filled with fluid F, the interior 92 of vessel 90 communicating with an expansion chamber 94 through a port 96. The expansion chamber is filled with nitrogen, air or other gas for expansion and contraction in response to flexing of membrane 88. Fluid F may be a silicone or other liquid such as an oil having precisely known ultrasonic transmission capabilities. A transducer T is located at one end of vessel 90 remote from membrane 88 for directing ultrasonic energy toward the membrane and for picking up the signals reflected from the face of membrane 88. Extending laterally at a right angle to the direction of ultrasonic propagation within the fluid medium F is a reference target RT located a predetermined distance x' from transducer T. The time distance between transducer T and the reflecting surface of membrane 88 in an unflexed state is x. Changes in the apparent value, $x_{meas.}$ are ultrasonically measured to determine the pressure P within fluid F'. If, in response to change in pressure and/or temperature within fluid F resulting from change in pressure of fluid F', or because of change either in ambient temperature or resulting from thermal conduction across membrane 88 from fluid F', there is a change in the velocity of the ultrasonic energy within medium F, compensation is made by control circuitry of the invention interconnected with transducer T.

For example, if in response to change in pressure or temperature of the sound-transmission medium F there is a measured $x'_{meas.}$ different from x', then a correction factor $cf = x'/x'_{meas.}$ is used by control circuitry of the invention to accurately convert diaphragm deflection $dx_{meas.}$ measured by transducer T into an equivalent change of pressure dP within fluid F'1 as by use of the relationship $$dP = K \left( \frac{x'}{x'_{meas.}} \right) dx_{meas.}$$

Apparatus of the invention may, of course, be used to measure absolute or relative pressure of fluid F'. For accuracy, transducer T may be driven at a high pulse repetition frequency, such as 2–4 MHz, and permitting vessel 90 to be of extremely compact dimension while achieving highly accurate measurement of pressure or pressure changes.

Figure 12:
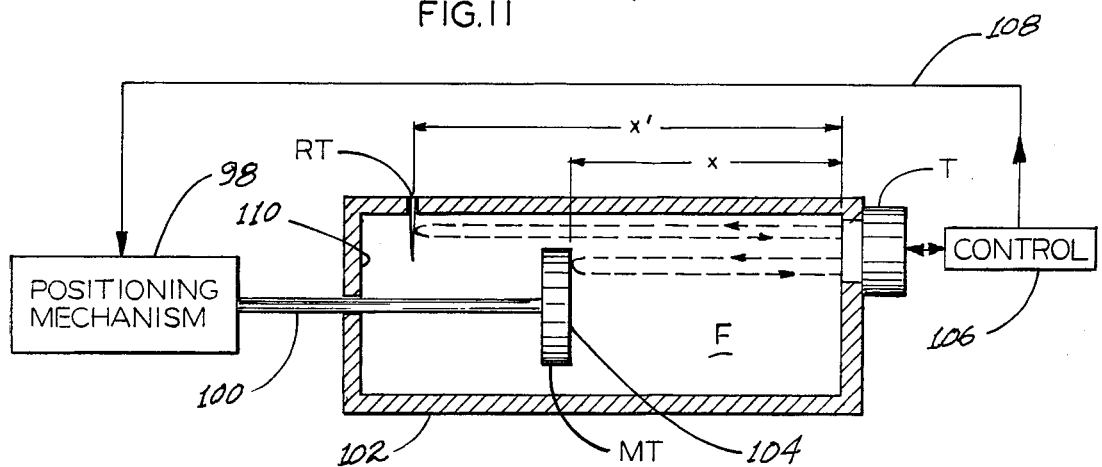
FIG. 12 is a cross section of a further cylinder having a piston, the position of which is ultrasonically measured relative to a reference target in accordance with the invention.

Referring to FIG. 12, an arrangement of the apparatus embodying the invention is disclosed as including a positioning mechanism 98 connected by a pushrod 100 to a movable target MT such as of plate or piston configuration within a vessel or other fluid-containing structure 102. The target is as providing a flat circular face 104 and is movable within a fluid F, which fills structure 102, in response to the positioning mechanism 98. The dimensions of target MT are such as to readily permit the fluid to pass around its periphery freely upon movement. A transducer T located at one end of structure 102 directs ultrasonic energy for reflection from face 104 as well as from a reference target RT constituted by a thin metal pin or wire extending laterally into fluid F at right angles to the ultrasonic waves at a precisely determined distance x' from the transducer. The distance between the transducer and movable target face 104 at any given time is x. Transducer T is interconnected with control circuitry 106 as hereinabove described which may, by means of a feedback path 108, The control circuitry 106 as previously described causes ultrasonic signals to be transmitted by transducer T and reflected from target face 104 as well as from reference target RT. Utilizing the time interval for reflection from the target reference RT as a correction factor by taking the ratio of the apparent, or measurement, distance $x'_{meas.}/x'$, the circuit corrects the reading or measurement of the distance x in a sense compensating for any changes in the pressure and temperature, or any other error-causing parameters, of fluid F. Said control circuitry 106 by use of the feedback control loop or path 108 may cause positioning mechanism 98 accurately and precisely to position a machine tool, part, other apparatus, or any of a variety of work-producing mechanisms. For extreme accuracy, a high ultrasonic frequency such as greater than 1 MHz may be used.

Proper design of structure 102 may permit elimination of the reference target RT and substitution instead of a pre-determined face or surface internally of structure 102, such as its end wall interior surface 110, and wherein the distance between the transducer T and said end surface 110 may be precisely predetermined for compensation of the output from control circuitry 106.

Manifestly, because of the capability of a position detecting system of the invention to accurately determine the relative position of various types of movable devices, a hydraulic cylinder with the new system can be utilized for synchronizing one positioning mechanism such as that designated 98 with another, or synchronizing one fluid-operated piston with another. Accordingly, a system of the invention may be used for slaving hydraulic or other fluid cylinders or other mechanisms to other simply and with a high degree of reliability and accuracy.

Figure 13:
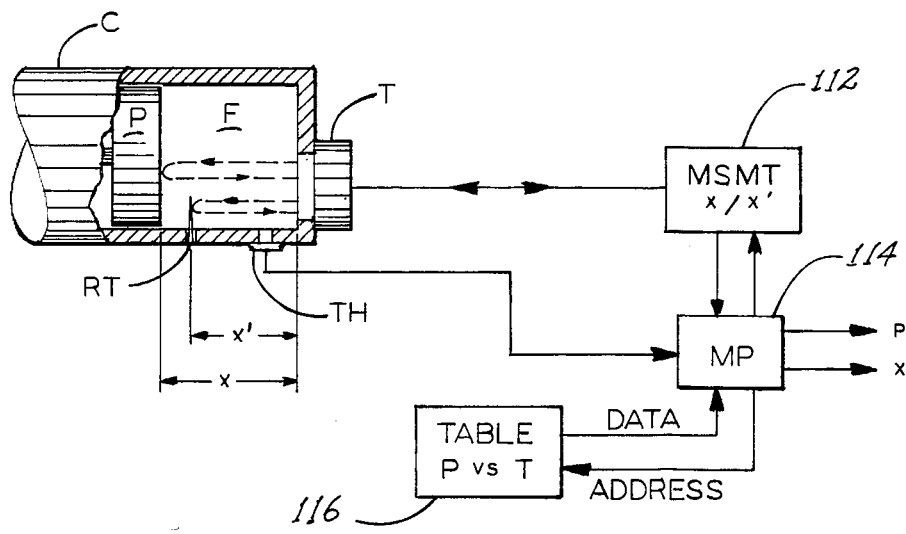
FIG. 13 is a system of the invention for determining piston position and fluid pressure within a fluid cylinder.

FIG. 13 is demonstrative of a use of the new system for measurement of parameters of a fluid F which may vary in response to different operating conditions, such as the development of high pressure, e.g., in excess of 5000 p.s.i. within a hydraulic cylinder C including a piston P. Thus, in the embodiment shown a transducer T is utilized for detecting the distance x to a piston P or other movable device for comparing same to a distance x' to a reference target RT. A measurement circuit 112 such as hereinabove described may be utilized to develop a ratio x/x' under the control of a microprocessor 114. A thermistor TH may be positioned within a wall of cylinder C for sensing the temperature of fluid F, with microprocessor 114 being utilized to sample the temperature sensed by such termistor. A random access memory, such as internally within microprocessor 114, may be utilized to develop a table 116 of data at different addresses of pressures within fluid F corresponding to given temperature therein, as determined in accordance with the known characteristics of fluid F for given values of the ration x/x'. Microprocessor 114 is utilized to address the table 116 in accordance with such values determined by measurement circuit 112 to provide data from table 116 for further processing by the microprocessor 114, e.g., being provided as outputs from microprocessor 114 values of the pressure P within cylinder C. Also, by the use of data in table 116, the measurement x/x' may be corrected for temperature to provide as an output of the microprocessor a signal indicative of the true position x of said piston P or other movable device.

Although the foregoing includes a description of the best modes contemplated for carrying out the invention, various modifications are contemplated.

As various modifications might be made in the constructions and methods herein described and illustrated without departing from the scope of the invention, it is intended that all matter contained in the foregoing description or shown in the accompanying drawings shall be interpreted as illustrative rather than limiting.

What is claimed is:

1. For use with a fluid cylinder, an ultrasonic system for accurately detecting the relative position of a piston moveable within the fluid cylinder, said system comprising the piston having a surface for reflecting ultrasonic signals, and a reference target within the cylinder for also reflecting ultransonic signals, an ultrasonic transducer for transmitting ultrasonic signals from a location fixed within the structure both to the piston and to the reference target for reflection thereby and for picking up the reflected ultrasonic signals, circuit means responsive to a first time interval between the transmitted and picked up signals for generating an electrical output signal which is a function of the position of the piston within the structure relative to the transducer, said circuit means also being responsive to a further time interval between the transmitted signals and those picked up after reflection by the reference target, and means for causing the output signal to be corrected as a function of the ratio between the first and further time intervals and correcting means including a microprocessor for causing the output signal to be corrected as a function of at least one parameter characteristic of said fluid which is subject to change causing error of the output signal.

2. An ultrasonic system as set forth in claim 1 wherein said reference target is constituted by a thin elongated member extending laterally into the path of said transmitted ultrasonic signals and carried by the structure.

3. An ultrasonic system as set forth in claim 1 wherein the reference target is carried by the piston and constitutes a dimensionally-reduced extension of the piston extending toward the transducer.

4. An ultrasonic system as set forth in claim 1 wherein said correction means comprises a random access memory for storage, under control of said microprocessor, of said first and further time intervals, said microprocessor being configured for utilizing said stored time intervals as a scaling factor for correction of said output signal.

5. An ultrasonic system as set forth in claim 1, wherein said piston is shiftable longitudinally within the fluid cylinder, the output signal being a function of the position of the piston and thereby of the operation of the positioning mechanisms and feedback means for controlling the positioning mechanism as a function of the output signal.

6. An ultrasonic system for accurately detecting the relative position of a moveable device within a fluid-filled structure containing said device, said system comprising an ultrasonic transducer for transmitting ultrasonic signals from a location fixed within the structure to the device for reflection thereby and for picking up the reflected ultrasonic signals, circuit means responsive to a first time interval between the transmitted and signals picked up by reflection from the devices for generating an electrical output signal which is a function of the position of the device within the structure relative to the transducer, and correcting means including a microprocessor for causing the output signal to be corrected as a function of at least one parameter characteristic of said fluid which is subject to change causing error of the output signal, said correction means including a microprocessor and a reference target within the structure for reflecting ultrasonic signals to the transducer to provide predetermined relative distance correlation with signals reflected from the device, said circuit means also being responsive to a further time interval between the transmitted signals and those picked up after reflection by the reference target, the microprocessor comparing the different signals picked up from the device and reference targetr for compensating for changes in velocity of sound in the fluid caused by change in said parameter by causing the output signal to be corrected as a function of the ratio between the first and further time intervals, and a parameter sensing device in said structure for sensing the magnitude of at least one such parameter, electronic data storage means accessible by the microprocessor for correlating the sensed parameter with a further parameter of said fluid, the microprocessor being operative to provide a first output which constitutes said output signal and a further parameter.

7. An ultrasonic system for accurately detecting the relative position of a piston moveable within a fluid cylinder, said system comprising an ultrasonic transducer for transmitting ultrasonic signals from one end of the cylinder to the piston for reflection thereby and for picking up the reflected ultrasonic signals, circuit means responsive to a first time interval between the transmitted and signals picked up by reflection from the device for generating an electrical output signal which is a function of the position of the piston within the cylinder relative to the transducer, and correcting means including a microprocessor for causing the output signal to be corrected as a function of at least one parameter characteristic of said fluid which is subject to change causing error of the output signal, pressure in the fluid being such a parameter, the correcting means comprising a pressure sensor for sensing fluid pressure in the cylinder.

8. An ultrasonic system as set forth in claim 7 wherein the sensing means comprises also a temperature sensor for sensing fluid temperature in the cylinder, and means for comparing the sensed pressure and temperature with electronically stored pressure or temperature data determining correction factors for correction of the output signal.

* * * * *